United States Patent [19]
Mayse

[11] 3,910,830
[45] Oct. 7, 1975

[54] FLUSH MOUNTED PROBE ASSEMBLY
[75] Inventor: Weldon D. Mayse, Houston, Tex.
[73] Assignee: Petrolite Corporation, St. Louis, Mo.
[22] Filed: Apr. 8, 1974
[21] Appl. No.: 458,604

[52] U.S. Cl............. 204/195 C; 204/225; 204/286; 204/297 R; 324/71 C; 73/86
[51] Int. Cl...................... G01n 27/46; G01n 27/30
[58] Field of Search .... 204/1 T, 195 C, 286, 297 R, 204/225; 73/86, 335; 324/71 C

[56] References Cited
UNITED STATES PATENTS

| | | | |
|---|---|---|---|
| 1,683,489 | 9/1928 | Rice | 73/86 |
| 2,783,644 | 3/1957 | Willis | 73/86 |
| 2,864,252 | 12/1958 | Schaschl | 73/86 |
| 2,993,366 | 7/1961 | Birkness | 73/86 |
| 3,007,340 | 11/1961 | Kraftson | 73/86 |
| 3,320,570 | 5/1967 | Lied | 73/335 |
| 3,406,101 | 10/1968 | Kilpatrick | 204/195 C |
| 3,558,462 | 1/1971 | Wilson | 204/195 C |

Primary Examiner—T. Tung
Attorney, Agent, or Firm—Emil J. Bednar

[57] ABSTRACT

A corrosion ratemeter probe assembly especially adapted for introduction into high pressure gas pipelines. The probe assembly features positive positioning relative to the pipeline and an integral seal for leakproof installation. The probe assembly carries a probe removably mounted within an internally shouldered nipple welded to the pipeline by "hot tapping" techniques. The probe has a cylindrical body with an annular seal adjacent to a sensing head which carries a plurality of flat surfaced metal electrodes. An adjustment nut threadedly mounts on a reduced diameter rear portion of the body and engages positively the shoulder on the nipple to position precisely the electrodes adjacent the inner wall surface of the pipeline. The nut is adjusted and locked into place after measurements of the relative longitudinal dimensions from the shoulder to the interior wall surface of the pipeline.

12 Claims, 4 Drawing Figures

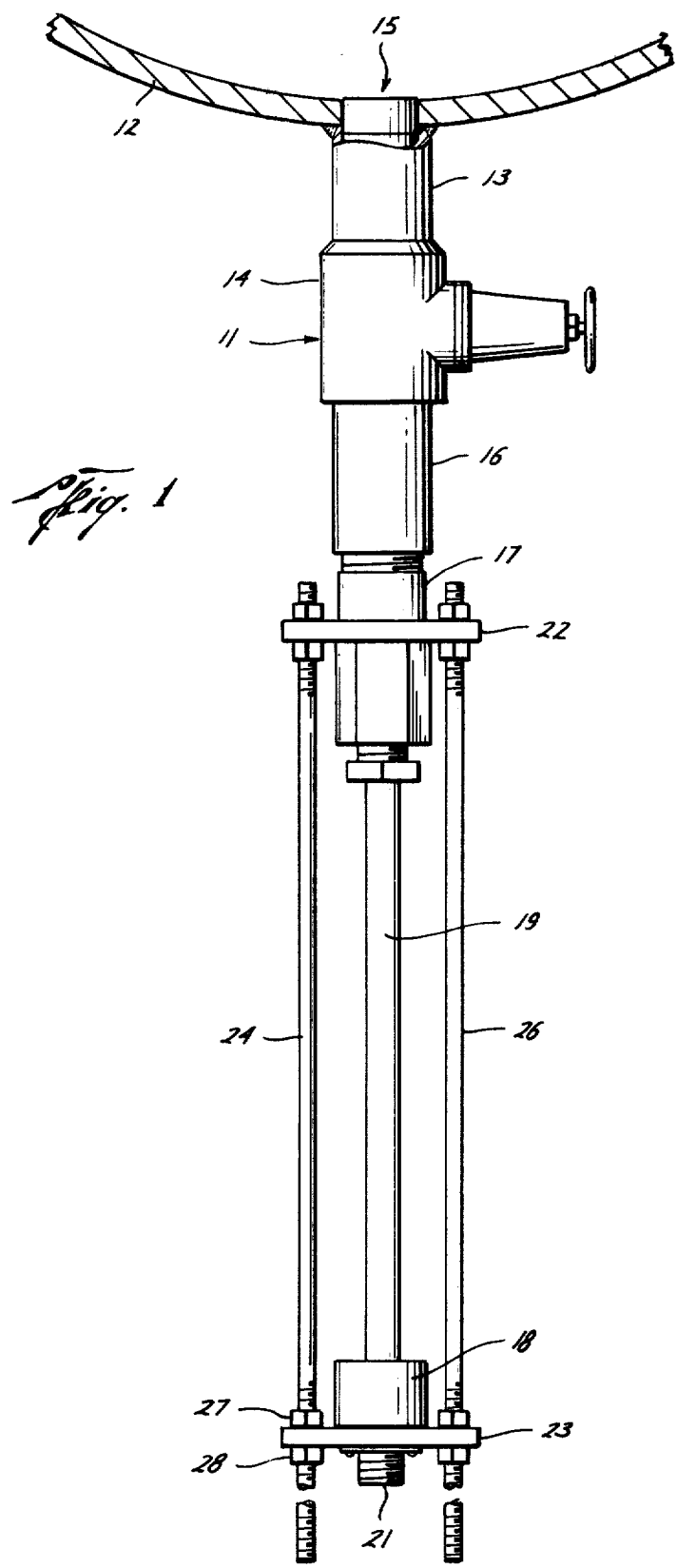

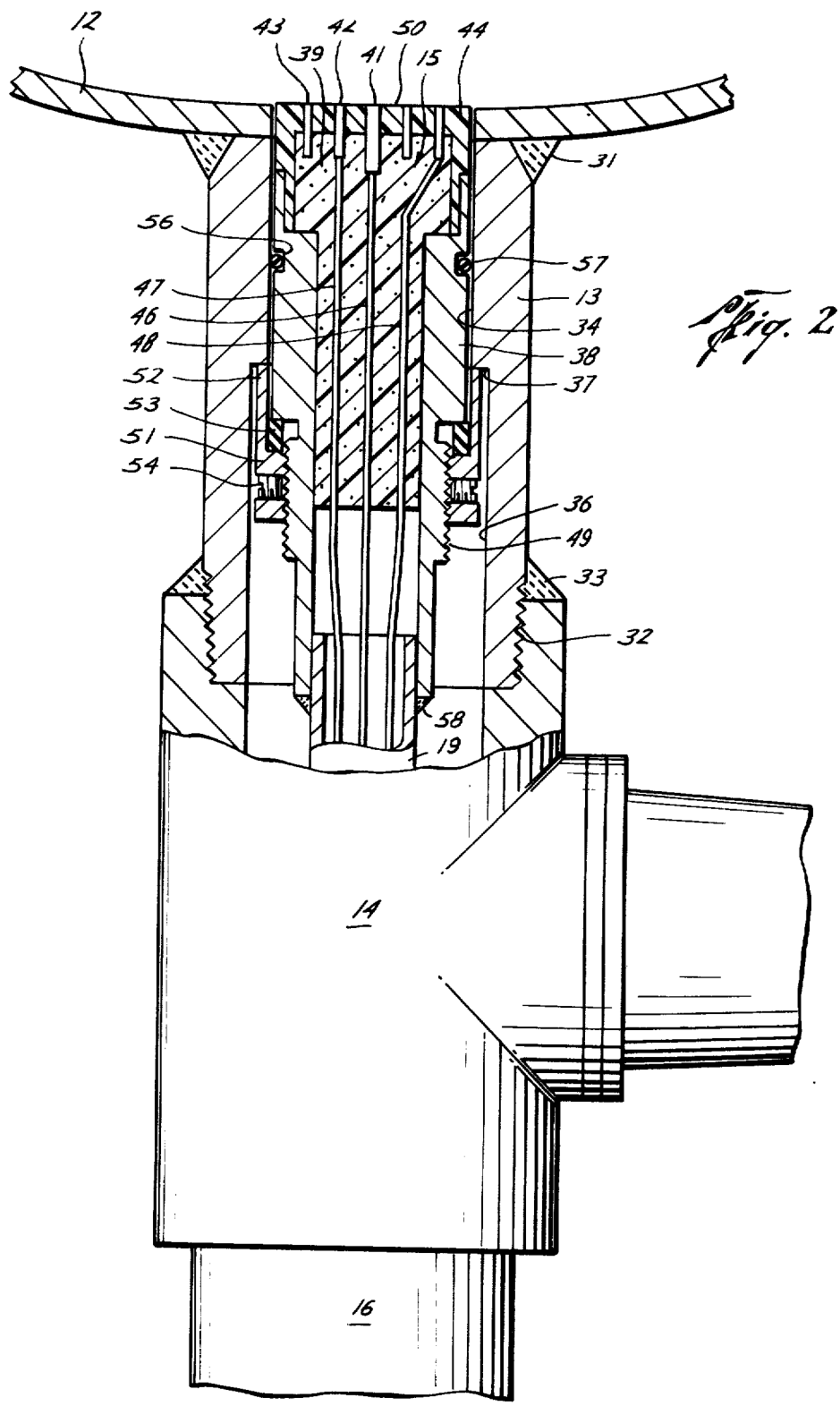

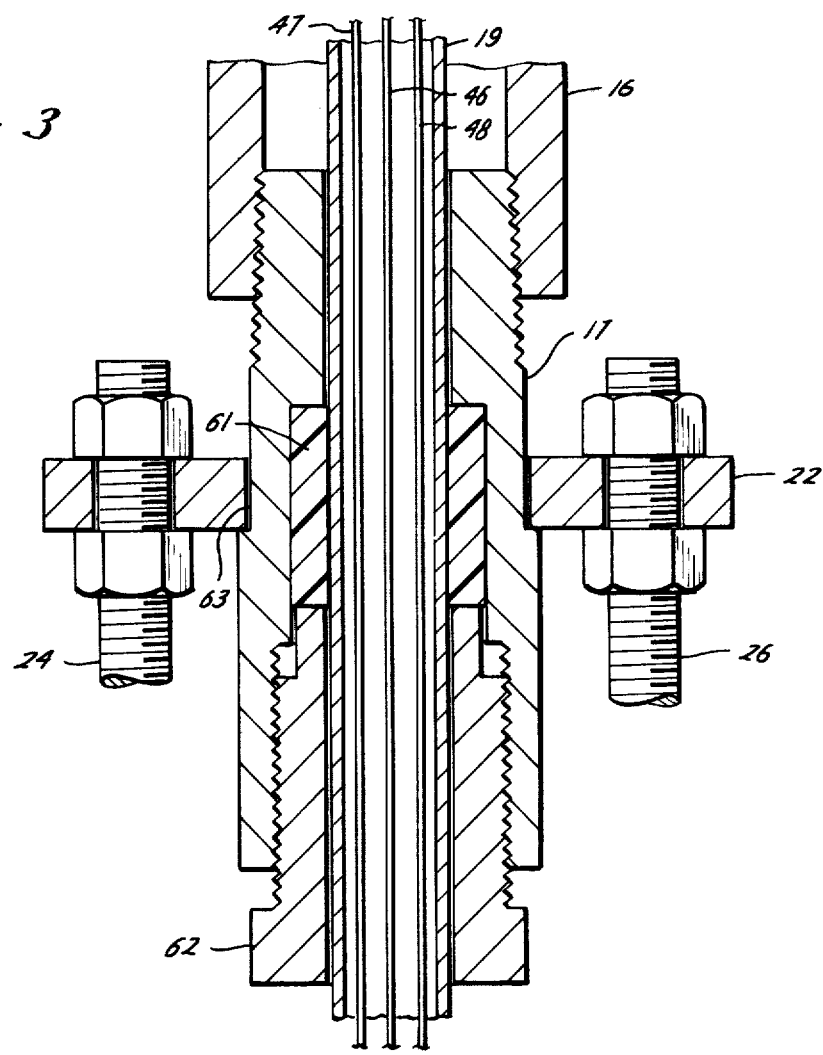
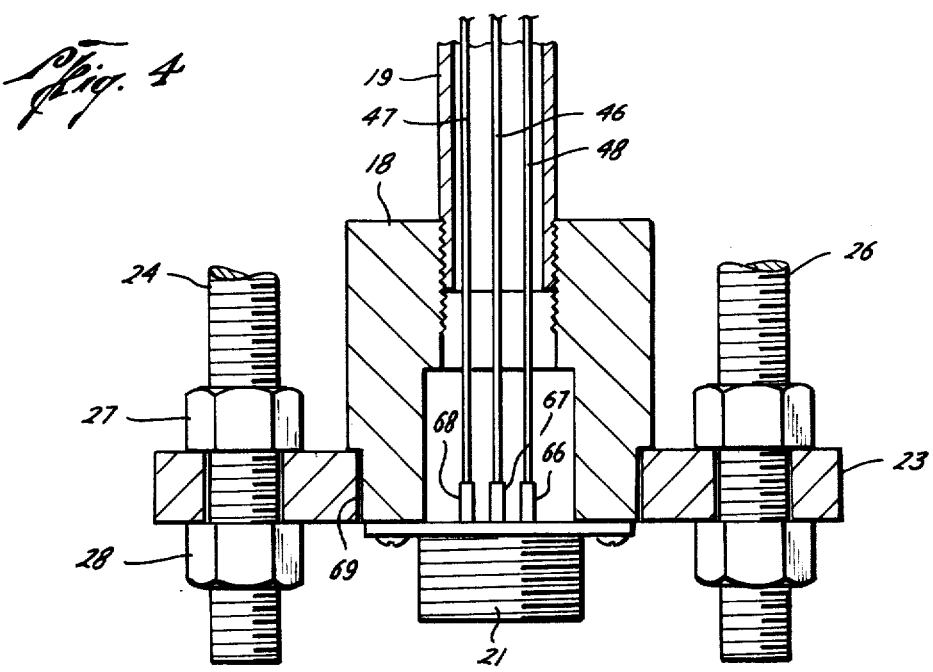

FLUSH MOUNTED PROBE ASSEMBLY

BACKGROUND OF THE INVENTION

1. Field of the Invention

This invention relates to measuring and testing corrosion processes, and relates particularly to the instruments and electrochemical techniques used in the study of corrosion processes.

2. Description of the Prior Art

It is desirable to determine the rates at which corrosion is occurring within gas pipelines carrying corrosive gases in high pressure environments. Corrosion measurements in these installations is becoming increasingly important from the standpoint of operating safety and prolonging the useful life of such piping systems. One important application is in monitoring the corrosion occuring in transmission pipelines which move natural gas from the producing regions to consuming areas throughout the country. These pipelines may be of a few inches in diameter, but they can be as large as 36 inches in diameter. Although many of these pipeline systems operate at moderate pressure ranges, the field gathering systems operate at pressures as high as 1,400 psi. Generally, the interstate gas transmission lines are designed in operation for 1,000 psi maximum. At the present time, there are approximately three-quarters of a million miles of gas pipelines throughout the United States which are subject to damage from unmonitored corrosion. Other pipeline systems carry gaseous materials which create corrosion of metal surfaces such as the vapor conduits within refineries and chemical plants.

Electrochemical techniques which use monitoring probes carrying rodlike electrodes extending into the gaseous phase of a pipeline are not entirely satisfactory where the moisture content of the conveyed gases is relatively small. For measurement purposes, it has been proposed to monitor the direct corrosion attack upon rod-like coupons extending into the gas stream. Alternatively, disc-like coupons have been installed along the inner wall surface of the pipelines. In either event, the direct measurement technique employing coupons has left much to be desired. First, an extended period of time is required to determine the corrosion attack within a pipeline. The coupon must be removed from its monitoring environment and taken to a laboratory for determination of the actual corrosion attack. Second, placement of the coupon within the pipeline has left much to be desired. The correct positioning of the coupon within the pipeline is preferably adjacent to the inner wall surface, leaving the pipeline clear for the traverse of various cleaning devices, such as "pigs". Another problem resides in the precise placement of coupons relative to the inner surface of the pipeline. It has been observed that there is a liquid film coating along the inner wall of the pipeline which may be as thick as 30 mils, but usually exists between 10 and 30 mils in thickness. The correct placement of a coupon is in this thin liquid film for the accurate measurement of corrosion within pipelines. Personnel responsible for the corrosion measurements usually specify the exact placement of the corrosion sensing element relative to the inner wall surface of the pipelines. Thus, corrosion sensing elements must be positioned within a few mils of a specified position!

It is preferred for a rapid and accurate results to measure the corrosion occurring within a pipeline by employing electrochemical effects upon metal electrodes of a probe assembly correctly positioned within the pipeline. An electrochemical process and apparatus especially useful in measuring corrosion rate is described in U.S. Pat. No. 3,406,101. In this technique, there is employed a corrosion ratemeter which includes a probe having three metal electrodes adapted to be exposed to a corrosive liquid. The instrumentation includes an adjustable current source, an ammeter, and a high impedance voltmeter as the primary components. The adjustable current source applies a small electric current between a "test" electrode and an "auxiliary" electrode. At the same time, the voltmeter monitors the induced polarization potential between the test electrode and a "reference" electrode. The current flow slightly polarizes the surface of the test electrode, and as a result, causes a shift in the potential between the test and reference electrodes. The current flow required to produce about 10 millivolts polarization is directly proportional to the corrosion rate of the test electrode undergoing corrosion.

One corrosion ratemeter employing the electrochemical technique which has found wide industrial acceptance is shown in U.S. Pat. No. 3,766,042. This corrosion ratemeter is portable and in the field makes quick and accurate measurements of corrosion in conjunction with a probe having three metallic electrodes. Other corrosion ratemeters of similar manufacture for making corrosion measurement may be employed. It would be advantageous to employ these corrosion ratemeters with a novel probe assembly for monitoring directly the corrosion occurring in a high pressure gas environment within a pipeline. The flush mounted probe assembly of the present invention provides these results. The probe assembly permits the ready, leakproof and positive introduction of a three electrode probe into the pipeline conduit to be monitored in such a manner that the electrodes are precisely aligned at a selected dimensional relationship to the inner sidewall surface of the pipeline. Normal operation of the pipeline is not disturbed. In addition, the seating of the probe relative to the pipeline is positive to a specified position, and a fluid seal is produced so that no leakage of fluids can occur about the probe. Other results obtained with the present probe assembly will be appreciated from the following discussion.

SUMMARY OF THE INVENTION

In accordance with this invention, a flush mounted probe assembly is provided which includes a nipple secured to a pipeline conduit having an opening therethrough in axial alignment with the nipple. The nipple has a cylindrical smooth-walled inner surface adjacent the conduit and also an enlarged cylindrical portion terminating in an abutting shoulder adjacent the smooth-walled inner surface. An end portion of the nipple is adapted to be secured to a valve. A probe is removeably mounted in the nipple and includes a cylindrical metal body. The body integrally carries a rigid insulator mounting a plurality of metal electrodes with terminal planar ends aligned transversely to the longitudinal axis of the body. Circumferential sealing means about the body cooperate with the smooth-walled inner surface of the nipple forming a fluid tight seal therebetween. A longitudinally adjustable metal stop on the metal body engages the abutment shoulder on the nipple so that the planar ends of the electrode are positioned a specific distance relative to the inner wall surface of the pipeline conduit. The metal stop is locked against displacement on the body. A tubular extension carries electrical conductors extending in electrical isolation from the body to an external circuit connector. The metal body is secured within the nipple with the metal stop in positive contact with the abutment shoulder of the nipple.

DESCRIPTION OF THE DRAWINGS

FIG. 1 is a side elevational view partial in section showing the probe assembly of the present invention mounted for monitoring the corrosion environment within a pipeline conduit;

FIG. 2 is an enlarged partial section of the portion of the structure in FIG. 1 adjacent to the pipeline conduit;

FIG. 3 is an enlarged sectional view of the central portion of the view of FIG. 1; and FIG. 4 is an enlarged sectional view of the end portion of the view of FIG. 1 remote from the pipeline conduit.

DESCRIPTION OF SPECIFIC EMBODIMENTS

Referring now to FIG. 1, there is shown a flush mounted probe assembly 11 of the present invention secured to a pipeline conduit 12 for monitoring the corrositivity of the fluid contained within such conduit. The conduit may be a natural gas pipeline, the vapor conduits in refineries or the like. The probe assembly 11 comprises a nipple 13 carrying a probe 15 in communication with the conduit 12. The nipple 13 is secured to a full opening valve 14, a tubular spacer 16, a packing gland assembly 17 and a terminal member 18. An interconnecting tubular extension 19 carries electrical conductors from the probe 15 to an electrical fitting 21 atop the terminal member 18. The packing gland 17 provides for affecting slideably a fluid seal about the extension 19. The probe 15 is secured in operative position by a jack screw mechanism including flanges 22 and 23 mounted upon shouldered portions of a packing gland 17 and terminal member 18. Threaded rods 24 and 26 are secured to the flange 22 by any convenient method such as nuts, and the other end of these rods traverse the flange 23. The rods 24 and 26 carry upper and lower nuts 27 and 28 embracing the flange 23. Adjustment of these nuts 27 and 28 moves the extension 19 relative to the packing gland 17 between an inward position where the probe 15 is secured in the conduit 12 and an extracted position where the probe 15 is withdrawn into the spacer 16 whereat the valve 14 can be closed forming a fluid tight seal relative to the conduit 12. With the valve 14 closed, the packing gland 17 can be unthreaded from the tubular spacer 16 and the probe 15 removed for inspection or replacement.

The conduit 12 usually has a wall thickness of from about one-quarter inch to about one-half inch in the most commonly encountered forms of pipeline systems. The placement of the probe assembly 11 into vapor conduits in a refinery or the like can encounter conduit 12 having different wall thicknesses. Placement of the probe 15 with its electrodes at a certain spaced relationship relative to the interior surface of the conduit 12 requires precise longitudinal positioning of the probe relative to the conduit 12. These features of the probe assembly 11 will be appreciated from the following description.

Referring now to FIG. 2, there is shown an enlarged partial sectional view of the probe 15, the nipple 13, the valve 14, and the spacer 16. More particularly, the nipple 13 in contact with the conduit 12 is secured by welded bead 31. If the conduit 12 is under superatmospheric pressure, the next construction is performed by "hot tapping" techniques. Any suitable equipment may be employed, but it is preferred to use equipment such as a T. D. Williamson Inc. T-101 drilling machine. The drilling machine is temporarily connected to the valve 14 mounted upon threads 32 of the nipple 13. The valve 14, preferably in gas-handling service, is secured to nipple 13 by a welded bead 33. At this time, a boring tool is passed through the nipple 13 and an opening provided within conduit 12 in axial alignment with the nipple 13. The boring tool is withdrawn, and the valve 14 is closed. Then, the assembly described in FIG. 1, including the packing gland 17, the rods 24 and 26, and the terminal member 18, are threaded into the spacer 16. The probe 15 is in a retracted position within the tubular spacer 16. The packing gland 17 is adjusted into a fluid tight engagement upon the extension 19. Now the valve 14 is opened and the probe 15 is moved longitudinally into a seated position within the conduit 12. For this purpose, the probe 15 has a novel construction to permit a positive positioning with a fluid tight seal to the nipple 13.

More particularly, the nipple 13 has a cylindrical smooth-walled surface 34 adjacent the conduit 12. This surface 34 provides for a cooperative sealing function with the probe 15. Also, the nipple 13 has an enlarged cylindrical portion 36 terminating in an abutment shoulder 37 adjacent the smooth-walled surface 34.

The probe 15 is constructed to cooperate with the smooth-walled surface 34 and the abutment shoulder 37 in providing a positive positioning and fluid tight mounting relative to the conduit 12. The probe 15 has a cylindrical metal body 38 with a central passageway in which is integrally carried a rigid insulator 39. The insulator 39 is shouldered within the body 38 so as to prevent any axial movement downstream from the conduit 12. The insulator 39 can be of any suitable dielectric material but preferably is formed of glass-filled epxoy. The insulator 39 mounts a plurality of metal electrodes 41, 42, and 43, which have terminal planar ends aligned transversely to the longitutdinal axis of the body 38. The electrodes can be constructed of any suitable metallic material, but preferably are of mild steel. The electrode 41 is rod-like and mounted centrally within the insulator 39. Spaced equidistantly therefrom is an annular electrode 42. The second annular metallic electrode 43 is spaced equidistantly from the electrode 42. For purposes of the present invention, the electrodes 41, 42, and 43 provide in the electrochemical technique of corrosion measurement the functions of reference, test, and third or auxiliary electrodes. A fluid tight covering 44 encloses the surface and end portion of the body 38. The covering 44 is preferably of a resilient material such as an elastomer capable of being molded about the insulator 39. Preferably the coating 44 is a water-wetted synthetic rubber, such as Viton or Buna N. The coating 44 fills the spaces between the electrodes, preferably forms the flat surface 50 extending in the plane containing the terminal planar end of the electrodes and has a cylindrical side surface. Conductors 46, 47, and 48 extend through the insulator 39 and provide an electrical connection to the electrodes 41, 42, and 43, respectively.

The probe 15 has the electrodes and resilient coating 44 providing a flat surface 50 which is positioned at a certain location relative to the inner sidewall surface of the conduit 12. The precise positioning of this flat surface will usually be dictated by the electrochemist. In most cases, this flat surface will be placed substantially at the tangent of the curved inner surface of the conduit 12 intersection with the axial opening receiving probe 15. Generally, it will vary not more than 30 mils from this tangent intersection on the conduit 12. For purpose of precise positioning, the probe 15 has a threaded reduced diameter portion 49 upon which is mounted a nut 51 for threaded movement longitudinally along the body 38. The nut 51 has an unthreaded sleeve portion 52 which extends about the body 38. The nut 51 at its interior terminus will be in metal-to-metal contact with the abutment shoulder 37. The threaded adjustment of the nut 51 upon the body 38 determines the exact position of the flat surface 50 of probe 15 relative to the inner sidewall surface of the conduit 12. Measurement of the distance between the abutment shoulder 37 and the interior sidewall surface of the conduit 12 permits the nut 51 to be precisely adjusted to the desired placement of the probe 15 in the conduit 12. To insure against inadvertent threaded movement of the nut 51, a metal ring 53 can be placed between the nut 51 and the body 38. The ring 53 can be of a variety of forms having selected widths to cover a variety of thickness of the conduit 12. For example, the ring 53 can have widths varying by fractios of an inch so that the precise placement of the flat surface of the probe 15 relative to the conduit 12 is obtained. The nut 51, once it is properly positioned upon the body 38, is securely locked into place by set screws 54. The body 38 also carries an annular groove 56 mounting an O-ring 57. The O-ring 57 is placed into a state of compression when engaging the smooth-walled surface 34 of the nipple 13. Thus, the O-ring 57 provides a fluid tight seal between the probe 15 and the nipple 13. The probe 15 carries a tubular extension 19 secured to its terminus by any convenient means, such as by a welded bead 58. The tubular extension 19 carries the conductors 46, 47, and 48 to the terminal member 18 for connection to the electrical fitting 21.

Referring now to FIG. 3, the extension 19 passes through the spacer 16 and the packing gland 17. The packing gland 17 carries a resilient packing 61 which is compressed between the extension 19 and a threaded packing nut 62 thereby providing a fliud tight seal at a second location in the probe assembly 11. The packing gland 17 carries a recessed area 63 upon which the flange 22 is mounted. As a result, the flange 22 is held against longitudinal outward movement by the recess 63. The nut 62 is adjusted so that the extension 19 may be moved slideably in fluid tight relationship though the packing gland 61 for installing or removing the probe 15 from the nipple 13.

Referring now to FIG. 4, the extension 19 terminates threadedly within the terminal member 18. The conductors 46, 47, and 48 extend to the electrical connector 21 and are connected to terminal pins 66, 67, and 68. The electrical connector 21 provides for convenient interconnection to an instrument such as described in U.S. Pat. No. 3,766,042 for carrying out electrochemical measuring of corrosion occurring within the conduit 12. The terminal member 18 carries a shoulder areas 69 upon which flange 23 is received. Thus, adjustment of the nuts 27 and 28 upon the threaded rods permits the tubular extension 19 to be moved into the packing gland 17 thereby forcing the probe 15 inwardly through nipple 13 until the abutment shoulder 37 engages the nut 51 for proper positioning of the flat surface 50 carrying electrodes 41, 42, and 43 relative to the inner sidewall surface of the conduit 12.

It will be apparent that other arrangements of the construction shown in FIGS. 2, 3, and 4 could be employed for sealing the probe 15 within the nipple 13, and also for insuring the securing of the probe 15 within the nipple 13 with the nut 51 in engagement with the abuting shoulder 37.

With the probe 15 mounted within the nipple 13, the electrochemical method of corrosion determination may be readily practiced. The conduit 12 during operation in natural gas pipeline systems carries a very thin liquid film upon its inner sidewall surface. This liquid film covers the electrodes 41, 42, and 43 and permits a polariation electrochemical technique to be performed according to the present invention. Since this liquid film covering is extremely thin, the proper positioning of the face of the probe 15 relative to the inner sidewall surface of the conduit 12 is extremely important. Usually, a person skilled in corrosion determination specifies the exact positioning of the flat surface of the probe 15 relative to the conduit 12. Thus, the precise arrangement of the adjusting nut 51 into abutment metal-to-metal contact with shoulder 37 produces the specific positioning of the probe 15 in the nipple 13.

From the foregoing, it will be apparent that there has been provided a flush mounted probe assembly which has a novel arrangement for the specific positioning at a predetermined location and fluid tight arrangement of an electrochemical monitoring probe relative to a pipeline conduit. Various changes and modifications may be made to the structure of the present probe assembly without departure from the spirit of the invention. It is intended that the present description be taken in illustration of the invention, and the appended claims define the scope thereof.

What is claimed is:

1. A flush mounted probe assembly comprising:
   a. a nipple secured to a pipeline conduit which has an opening therethrough in axial alignment with said nipple, said nipple having a cylindrical smooth-walled inner surface adjacent said conduit, an enlarged cylindrical portion terminating in an abutment shoulder adjacent said cylindrical smooth-walled inner surface, and an end portion adapted to be secured to a valve means; and
   b. a probe removably mounted in said nipple and including a cylindrical metal body carrying internally a rigid insulator mounting a plurality of metallic electrodes at one end of said body, said electrodes separated from one another by intervening, fluid-impervious insulating medium, said metallic electrodes and insulating medium having a common terminal planar surface aligned transversely to the longitudinal axis of said body, sealing means carried circumferentially about said body to cooperate with said cylindrical smooth-walled inner surface of said nipple thereby forming a fluid tight seal therebetween, a longitudinally adjustable metal stop means on said body to engage said abutment shoulder on said nipple whereby said terminal planar surface of said electrodes and said insulating medium is positioned a certain distance from the interior wall surface of said pipeline conduit, locking means to secure said metal stop means against displacement on said body, a tubular extension carrying electrical conductors extending in electrical isolation from said body to form an external circuit connector, and securing means to hold said body in said nipple with said metal stop means in contact with said abutment shoulder of said nipple.

2. The flush mounted probe of claim 1 wherein said insulating medium is a flat nosed elastomer moulded about the end of said body leaving exposed the planar ends of said electrodes but filling the spaces therebetween and having a cylindrical exterior surface of a dimension sufficient to traverse the opening in said pipeline conduit.

3. The flush mounted probe of claim 1 wherein said metal stop means comprises a metal ring threadedly mounted upon said metal body of the probe.

4. The flush mounted probe of claim 3 wherein a second metal ring is mounted on the metal body between said metal ring and said metal body whereby said metal ring serves as a longitudinal spacer relative to said abutment shoulder on said nipple.

5. The flush mounted probe of claim 3 wherein said locking means comprises set screw means carried by said metal ring to engage said metal body thereby securing said metal ring against displacement.

6. The flush mounted probe of claim 1 wherein said securing means includes longitudinal extending take-up rods having retaining nuts mounted on the ends of said rods.

7. A flush mounted probe assembly comprising:
a. a nipple secured normally to a pipeline conduit which has an opening therethrough in axial alignment with said nipple, said nipple having a cylindrical smooth-walled inner surface adjacent said conduit, an enlarged cylindrical portion terminating in an abutment shoulder adjacent said smooth-walled inner surface and an end portion secured to a first end of a valve means having a full opening passageway;
b. said valve means at its second end connected to a tubular spacer having a length at least that of said nipple;
c. a probe removably mounted in said nipple and including a cylindrical metal body carrying integrally a rigid insulator mounting a plurality of metal electrodes at one end of said body, said electrodes separated from one another by intervening fluid-impervious insulating medium, said metallic electrodes and insulating medium having a common terminal planar surface aligned transversely to the longitudinal axis of said body, sealing means carried circumferentially about said body to cooperate with said cylindrical smooth-walled inner surface of said nipple thereby forming a fluid tight seal therebetween, a longitudinally adjustable metal stop means on said body to engage said abutment shoulder on said nipple whereby said terminal planar surface of said electrodes and said insulating medium is positioned a certain distance from the interior wall surface of said pipeline conduit, locking means for securing said metal stop means against displacement on said body, a tubular extension carrying electrical conductors extending from said body through said valve means and tubular spacer to a first flange at one end of said tubular extension, said electrical conductors forming an external circuit connector with said electrodes;
d. a packing gland means secured to said tubular spacer and engaging said tubular extension in fluid tightness, said packing gland means carrying a second flange; and
e. securing means to hold said body in said nipple with said metal stop means in contact with said abutment shoulder of said nipple, said securing means including longitudinal extending take-up rods secured at one of their ends to one of said flanges and at the other of their ends to the other of said flanges 8. The flush mounted probe of claim 7 wherein said insulating medium is a flat nosed elastomer moulded about the end of said body leaving exposed the planar ends of said electrodes but filling the spaced therebetween and having a cylindrical exterior surface of a dimension sufficient to traverse the opening in the said pipeline conduit.

9. The flush mounted probe of claim 7 wherein said metal stop means comprises a metal ring threadedly mounted upon said metal body of the probe.

10. The flush mounted probe of claim 9 wherein a second metal ring is mounted on the body between said metal ring and said metal body whereby said metal ring serves as a longitudial spacer relative to said abutment shoulder on said nipple.

11. The flush mounted probe of claim 9 wherein said locking means comprises set screw means carried by said metal ring to engage said metal body thereby securing said metal ring against displacement.

12. A flush mounted probe assembly comprising:
a. a nipple secured to a pipeline conduit which has an opening therethrough in axial alignment with said nipple, said nipple having a first portion with a cylindrical smooth-walled inner surface, a second portion carrying means forming an abutment means, and a third portion carrying exterior threads; and
b. a probe removably mounted in said nipple and including a cylindrical metal body carrying internally a rigid insulator mounting a plurality of metallic electrodes at one end of said body, said metallic electrodes projecting longitudinally beyond said rigid insulator and being electrically isolated from one another by a fluid-impervious insulating medium filling substantially completely the spaces between said electrodes and extending to the longitudinal extremities of said electrodes, said metallic electrodes and insulating medium having a common terminal planar surface aligned transversely to the longitudinal axis of said body, sealing means carried circumferentially about said body to cooperate with said cylindrical smooth-walled inner surface of said first portion of said nipple thereby forming a fluid tight seal therebetween, stop means carried on said body to engage said abutment means on said nipple whereby said terminal planar surface of said electrodes and said insulating means is positioned a certain longitudinal distance from the interior wall surface of said pipeline conduit, electrical conductor means extending in electrical isolation from said body to form an external circuit connector, and securing means to hold said body in said nipple against unintentional displacement.

* * * * *

UNITED STATES PATENT OFFICE
CERTIFICATE OF CORRECTION

PATENT NO. : 3,910,830
DATED : October 7, 1975
INVENTOR(S) : Weldon D. Mayse

It is certified that error appears in the above-identified patent and that said Letters Patent are hereby corrected as shown below:

Column 5, line 51, for "fliud", read ---fluid---; and

Column 8, line 61, for "said insulating means", read ---said insulating medium---.

Signed and Sealed this sixth Day of January 1976

[SEAL]

Attest:

RUTH C. MASON
Attesting Officer

C. MARSHALL DANN
Commissioner of Patents and Trademarks